United States Patent [19]

Fusiak

[11] Patent Number: 5,334,331
[45] Date of Patent: Aug. 2, 1994

[54] METHOD OF ACTIVATING N-METHYL-2-PYRROLIDONE (NMP) VARNISH AND PAINT REMOVER SOLVENTS FOR REMOVAL OF ORGANIC COATINGS

[75] Inventor: Frank Fusiak, Bayonne, N.J.

[73] Assignee: ISP Investments Inc., Wilmington, Del.

[21] Appl. No.: 3,169

[22] Filed: Jan. 12, 1993

[51] Int. Cl.$^5$ .................. C09D 9/00; C11D 7/32; C11D 7/50
[52] U.S. Cl. .......................... 252/542; 134/38; 134/40; 252/153; 252/162; 252/171; 252/174.15; 252/364; 252/DIG. 8
[58] Field of Search .......... 252/162, 179, 171, 174.15, 252/364, 542, 153, DIG. 8; 134/38, 40

[56] References Cited

U.S. PATENT DOCUMENTS

| | | | |
|---|---|---|---|
| 4,120,810 | 10/1978 | Palmer | 252/153 |
| 4,324,595 | 4/1982 | Kasprzak | 134/38 |
| 4,501,682 | 2/1985 | Goodman et al. | 252/171 |
| 4,664,721 | 5/1987 | Valasek | 134/26 |
| 4,685,930 | 8/1987 | Kasprzak | 252/174.15 |
| 4,689,168 | 8/1987 | Requejo | 252/139 |
| 4,722,835 | 2/1988 | Schamper et al. | 424/66 |
| 4,749,510 | 6/1988 | Nelson | 252/166 |
| 4,753,844 | 6/1988 | Jones et al. | 428/288 |
| 4,812,255 | 3/1989 | Suwala | 252/142 |
| 4,836,950 | 6/1989 | Madsen | 252/153 |
| 4,960,533 | 10/1990 | Wisniewski et al. | 252/142 |
| 5,035,829 | 6/1991 | Suwala | 252/170 |
| 5,049,300 | 9/1989 | Fusiak et al. | 252/162 |
| 5,073,287 | 12/1991 | Harelstad | 252/153 |
| 5,089,164 | 8/1992 | Stanley | 252/162 |
| 5,106,525 | 4/1992 | Sullivan | 252/153 |
| 5,124,062 | 6/1992 | Stevens | 252/162 |
| 5,154,848 | 10/1992 | Narayanan et al. | 252/162 |
| 5,167,853 | 12/1992 | Stevens | 252/162 |

FOREIGN PATENT DOCUMENTS 518555 12/1992 European Pat. Off. ........ 252/174.15

OTHER PUBLICATIONS

CIFA *International Cosmetic Ingredient Dictionary* Fourth Edition 1991 p. 127.

*Primary Examiner*—Linda Skaling
*Attorney, Agent, or Firm*—Marilyn J. Maue; Joshua J. Ward

[57] ABSTRACT

This invention is directed to an environmentally safe, water soluble stripping composition comprising between about 30 and about 98.5 wt. % N-methylpyrrolidone or a 10/90 to 90/10 mixture of N-methylpyrrolidone and gamma-butyrolactone and between about 0.1 and about 5 wt. % cyclomethicone. The invention also concerns the use of this composition in a process for stripping organic coatings such as paints, resins, varnishes and shellac from substrates.

12 Claims, No Drawings

METHOD OF ACTIVATING N-METHYL-2-PYRROLIDONE (NMP) VARNISH AND PAINT REMOVER SOLVENTS FOR REMOVAL OF ORGANIC COATINGS

BACKGROUND OF THE INVENTION

1. Field of the Invention

This invention relates to paint and varnish remover compositions, and more particularly, to a method of activating NMP and/or BLO for more effective paint and varnish removing action, and to compositions thereof.

2. Description of the Prior Art

The term "varnish and paint remover" as applied herein refers to chemical compositions which can strip or facilitate stripping of coatings, such as, paint, varnish, lacquer, shellac, polyurethane finishes and enamels, used to protect substrates such as wood and metal and to beautify them.

Methylene chloride paint strippers are currently the industry standard for stripper performance. Methylene chloride strippers are effective for quickly softening most types of paints. The speed at which methylene chloride performs is believed to be due to its high solvent power coupled with high volatility as reflected by its extremely fast evaporation rate. This high volatility shortens the work life of methylene chloride paint strippers. Frequently, when methylene chloride paint strippers are used on thick accumulations of paint, more than one application is required since the work life is insufficient to permit penetration through the accumulation of paint.

Methylene chloride is a chlorinated solvent which is closely regulated for environmental protection. Recently, it was discovered that methylene chloride can cause tumors in rats and mice. Since that discovery, the wide use of that solvent by industry and consumers has come under close scrutiny by federal regulatory agencies.

N-methyl-2-pyrrolidone (NMP) has been employed in place of methylene chloride as the active ingredient in paint stripper compositions. Nelson, in U.S. Pat. No. 4,759,510, for example, described a composition for this use having low volatility which included about 20% to 90% by weight of NMP and 30% to 70% by weight of an aromatic hydrocarbon solvent.

Mixtures of NMP and gamma-butyrolactone (BLO) also have been used as liquid formulations for removing screen printing inks. Madsen, in U.S. Pat. No. 4,836,950, for example, described such a liquid composition which included 1-25% by volume of NMP and/or BLO. Valasek, similarly, in U.S. Pat. No. 4,664,721, described a composition which included 30-85% by weight of NMP and 10-35% by weight of an oxygenated solvent selected from esters and ethers. BLO was mentioned as a suitable ether, although butoxyethanol and cyclohexanone were preferred. This mixture of solvents was considered effective for paint sprayed graffiti as a viscous, transparent gel containing particles of silica or alumina in suspension. Palmer, in U.S. Pat. No. 4,120,810, described paint remover compositions of NMP and/or BLO, and at least 35 mole % of blends of alkyl naphthalenes and alkyl benzenes.

These and other compositions, however, have not proven particularly effective for removing paint and varnish from wood and metal surfaces, without containing objectionable halogenated or aromatic compounds. Furthermore, they do not possess the attributes of being biodegradable, non-flammable, having a low vapor pressure and low toxicity.

Accordingly, it is the object of the present invention to satisfy the above criteria for an environmentally safe commercial product for removing paint and varnish from surfaces, and to perform such removal effectively with less material than other related products on the market today.

These and other objects and features of the invention will be made apparent from the following description and disclosure.

THE INVENTION

In accordance with this invention there is provided a water soluble stripping composition which comprises between about 30 and about 98.5 wt. %, preferably between about 50 and about 90 wt. % N-methylpyrrolidone or a 10/90 to 90/10 mixture of N-methylpyrrolidone (NMP) and gamma-butyrolactone (BLO) and between about 0.1 and about 5 wt. %, preferably between about 0.3 and about 3.0 wt. % cyclomethicone. The optimum compositions are those which contain diluents in a concentration of from 0 to about 50%, most preferably from about 10 to about 40%, based on total composition.

The cyclomethicone employed in the present composition is a volatile cyclic dimethyl polysiloxane having the formula

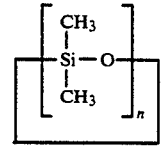

where n has a value of from 3 to 6. This compound is produced commercially by Dow Corning and General Electric and sold under the tradenames of Dow Corning ® 245 and 345 and General Electric ® SF 1173, SF 1202 and SF1204 and has been used for personal care applications such as in facial cleansers. U.S. Pat. No. 4,960,533 assigned to Colgate-Palmolive discloses a composition of cyclomethicone and a polyalkylene oxide modified polysiloxane as a soap scum remover.

The present composition can be used to remove any resinous coating from a substrate. The composition can be applied by spraying, dipping, brushing, wiping on the coating of a plastic, glass, wood or metal surface or the coated substrate can be immersed in the above composition for separation of the coating. The composition, when administered to a coated surface, is generally applied in a thickness of from about 1/16" to about ¼" or in a thickness adequate to loosen the resinous coating as is consistent with economic considerations and dependent upon the chemical nature and thickness of the resinous coating. Also one or more applications of the stripping composition can be employed, if desired.

The present stripping composition optionally contains other additive components in about the following concentrations based on total basic composition of active components, i.e. NMP or NMP/BLO and cyclomethicone; however, it is understood that larger amounts of these additives can be used but that, in most cases, such excess does not provide added benefit. Also it will become obvious from the following disclosure that many of the additive compounds serve dual functions.

More specifically, a water soluble surfactant in an amount between about 0.01 and about 10 weight % can be added to the basic composition so as to provide better wetting properties by lowering the surface tension of the formulation, thus insuring complete coverage and a more uniform coating on the coated substrate. The surfactant may also assist in removing and dislodging loosened coating particles during the stripping operation. Suitable surfactants include non-ionic, anionic, cationic or amphoteric types which include monocarboxyl cocoimidoazoline (e.g. ANTRON®), higher alkyl sulfate sodium salts (e.g. DUPONOL®), tridecyloxy poly(alkyleneoxy ethanol) (e.g. EMULPHOGENE®), ethoxylated or propoxylated alkyl phenol (e.g. IGEPAL®), alkyl sulfoamides (e.g. IGEPON®), $C_{10}$-$C_{18}$ alkaryl sulfonates (e.g. SANTOMERSE®), cocoamphodipropionate (e.g. MIRANOL®), cetylpalmitic alkanol amides (e.g. CENTROL®), hydrogenated castor oil (e.g. PARASYN®), isooctylphenyl polyethoxy ethanol (e.g. TRITON®), sorbitan monopalmitate (e.g. SPAN® 40), dodecylphenyl polyethylene glycol ether (e.g. TERGITROL®), N-$C_8$ to $C_{18}$ alkyl pyrrolidone (e.g. SURFADONE®), polyalkoxylated fatty acid esters (e.g. TRYDET®), N-coco-beta-amino propionic acid and polyethoxy amino salts thereof, sodium alkylbenzene sulfonate and mixtures of the above, such as a mixture of sodium alkylbenzene sulfonate and SURFADONE®. Examples of other suitable surfactants are described by Cahn et al., "Surfactants and Detersive Systems", 1983, published by John Wiley & Sons in Kirk-Othmer's Encyclopedia of Chemical Technology, 3rd Ed. (1983), pages 332-432.

For extending the life of the composition and the cyclomethicone residence time on the substrate, evaporation retardants can be used in an amount between about 0.1 and about 5 weight % of the basic composition of which siloxane, stearic acid, a paraffinic wax or beeswax are examples. For cost reduction, cosolvents or diluents can be used to extend the stripping composition and to reduce formulation cost. Examples of such additives include tetrahydrofurfuryl alcohol, alkylene glycol ether acetates, alkylene glycol ethers, such as triethylene glycol methyl ether, propylene glycol methyl ether, tripropylene glycol methyl ether, diethylene glycol ethyl ether, etc., alcohols and glycols, such as ethylene glycol, propylene glycol, cyclohexanol, etc., substituted lactams such as N-octyl-2-pyrrolidone; dimethyl imidiazolidinone, tetramethyl urea, cyclic carbonates such as propylene carbonate, ethylene carbonate, butylene carbonate, terpene hydrocarbons such as d-limonene, aromatic hydrocarbons such as toluene, xylene, etc. water, ketones such as cyclohexanone, methyl isobutyl ketone, etc., esters such as ethyl lactate, ethylene diacetate, etc. and mixtures of the above diluents.

Additionally, coactivators can be used to modify the activity of the basic composition. Such coactivators include formic acid, acetic acid, hydroxy acetic acids, hydrogen peroxide, ethyl-3-ethoxy propionate and alkalis such as organoamines (e.g., monoethanol amine and triethanolamine). Generally, not more than 10% of the coactivator is desirable in the above basic composition. To minimize corrosion of metal surfaces when acids are included in the formulation, certain corrosion inhibitors in an amount of from 0.1 to about 3 wt. % may also be included, examples of which are an ethoxylated butynediol, petroleum sulfonates (e.g. Alox 575), and blends of propargyl alcohol and thiourea, e.g. Rodine supplied by Amchem Products Inc. or Armohib supplied by A3Azo Chemicals Inc. Buffers also can be used in the above acid environment to control the pH to about 3-4.5 and thus minimizing corrosive effects on metals. Organoamine buffers such as triethanolamine, morpholine, triethylamine, amino ethyl pyrrolidone, and the like or their mixtures are suitably employed.

For certain applications where large coated surfaces militate against immersion or where vertical surfaces are to be sprayed, thickening agents can be used to retain the composition on the coating surface for an extended contact time sufficient to loosen the coating. The thickeners employed are those which are stable with respect to the components and can be added to a concentration of between about 0.5 and about 20 weight % of the basic composition. Examples of such additives include thickeners of the cellulose type, e.g. hydroxypropyl cellulose (e.g. Klucel), ethyl cellulose, ethyl hydroxyethyl cellulose, methyl cellulose, colloidal silica, clays such as bentonite, starch, colloidal alumina, gum arabic, tragacanth, agar, high molecular weight polyethylene oxides, polyoxyethylene-polyoxypropylene glycol-block copolymers, guar gum, xanthan gum, and polyvinylpyrrolidone and methyl vinyl ether/maleic anhydride copolymers. It is also to be understood that any of the above diluents can be added to lower the viscosity of the stripping composition for certain applications.

Of the above thickeners, those of the cellulose type are preferred and Klucel®, containing repeating units of anhydroglucose

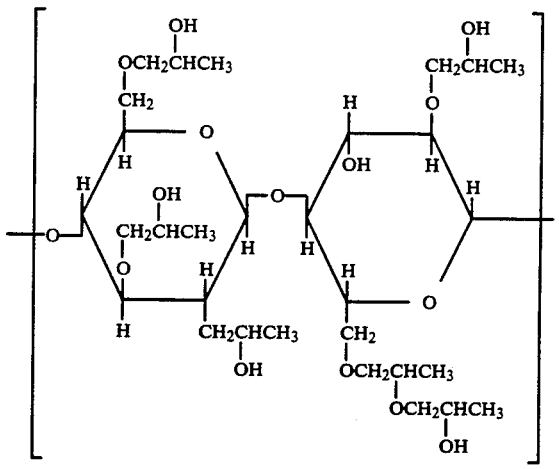

in which 4 or more of the hydroxyl groups are converted to ether or hydroxyalkyl groups, is particularly preferred.

Klucel® H has a similar chemical structure to Klucel MS 3.0, which may also be used, but is of higher molecular weight, and possesses particular advantages in terms of the viscosity of its solutions. Thus, a 1% solution of Klucel H in water has a viscosity in the range from 1,500 to 2,500 units and in ethanol the range is 1,000 to 2,500 units while solutions of Klucel® MS 3.0, particularly in ethanol, have a lower viscosity. The property of possessing a substantially similar viscosity in organic solvent and aqueous solutions is a valuable one for gelling agents used in compositions according to the present invention.

Representative of some typical and general formulations are the following:

| | PARTS BY WEIGHT COMBINED IN A 100% COMPOSITION | |
|---|---|---|
| | Preferred | Optimum |
| A. | | |
| NMP | 50-99 | 60-70 |
| Cosolvent/Diluent | 0-50 | 20-30 |
| Cyclomethicone | 0.3-3.0 | 0.4-0.6 |
| B. | | |
| NMP | 10-99 | 20-90 |
| BLO | 0-70 | 10-60 |
| Cyclomethicone | 0.3-3.0 | 0.4-1.0 |
| Cosolvent/Diluent | 0-50 | 10-20 |
| Surfactant | 0-3 | 1-2 |
| Thickening Agent | 0-5 | 1-4 |
| Buffering Agent | 0-3 | 1-2 |
| Coactivator | 0-10 | 1-7 |

Generally the thickening agent, when needed, is added after the other components are mixed to form a homogeneous composition. The order of addition for the other components is not critical.

Although composition A is suitable for the removal of resinous coatings, it is recommended that the present compositions also include a surfactant and more often a thickening agent and a vaporization retardant. Additionally, the inclusion of a cosolvent and diluent is useful for extending the stripping composition in certain applications. Buffers, coactivators and corrosion inhibitors can also be employed for more difficulty removable coatings.

Generally it is also recommended that the present compositions be prepared by slowly adding NMP or NMP/BLO, diluent and cyclomethicone, alone or in admixture with a coactivator, to any remaining components of the overall composition and before the addition of any viscosity adjusting adjuvant. The addition is made with agitation at about room temperature until a homogeneous solution is formed. Thickeners or diluents, when needed, can be added after the homogeneous mixture is obtained, and in cases where high molecular weight thickeners are employed, the solution can be slightly heated up to about 40° C. to assist in their incorporation. The composition is then applied to the coated substrate under ambient conditions or, when faster stripping is required, at a temperature up to 45° C. The stripping operation can be carried out until the coating is separated from the substrate, usually within a period of from about 5 minutes to about 5 hours, normally not more than 3 hours and often less than a few minutes, depending on the particular stripping composition, the thickness and chemical composition of the coating involved. The loosened resinous particles are then brushed off or washed away with a water spray leaving a clean substrate surface.

The present stripping compositions are particularly beneficial in removing paint primers, shellacs, varnishes and paints, including alkyd enamels, acrylic latexes, acrylic enamels, polyurethane, epoxies, from metal or other surfaces. Additional, equally important advantages of the instant stripping compositions include water solubility, and biodegradability. Instant stripping compositions are non-combustible and contain none of the harmful and ecologically objectionable components of other stripping formulations which include halogenated compounds, oxalic acid, and/or chromates. It has also been found that the cyclomethicone reduces the surface tension of methylpyrrolidone and its mixture with butyrolactone. The above advantages make for ideal stripping conditions in a wide field of applications for the removal of paints, varnishes, inks, primer coatings, lacquers, enamels, shellacs and other resinous coatings which may be used to protect or to decorate a substrate.

Having generally described the invention, reference is now had to the following examples which illustrate preferred embodiments but which are not to be construed as limiting to the scope of the invention as more broadly defined above and in the appended claims.

EXAMPLES 1-5

The compositions shown in following Table I were prepared under ambient conditions. The components (parts by weight) were added and mixed in the order listed using a standard laboratory stirrer and were blended until homogeneous solutions were obtained.

TABLE I

| Components | A | B | C | D | E | F | G | H | I | J | K | L |
|---|---|---|---|---|---|---|---|---|---|---|---|---|
| | | | | | Wt. % | | | | | | | |
| NMP | 98.5 | 99.0 | 68.0 | 68.5 | 37 | 37 | — | — | — | — | 49.5 | 49.5 |
| BLO | — | — | — | — | 57 | 57.5 | — | — | 99.0 | 98.5 | 49.5 | 49.5 |
| Cyclomethicone (Dow Corning 245) | 0.5 | — | 0.5 | — | 0.5 | — | — | 0.5 | — | 0.5 | — | 0.5 |
| Klucel ® H | 1.0 | 1.0 | 1.5 | 1.5 | 1.5 | 1.5 | 1.0 | 1.0 | 1.0 | 1.0 | 1.0 | 1.0 |
| Ethyl-3-ethoxypropionate | — | — | 4.0 | 4.0 | 3.0 | 3.0 | — | — | — | — | — | — |
| Propylene carbonate | — | — | 18.0 | 18.0 | — | — | — | — | — | — | — | — |
| Emulphogene ® DA-630** | — | — | 1.0 | 1.0 | 1.0 | 1.0 | — | — | — | — | — | — |
| Formic Acid (95%) | — | — | 7.0 | 7.0 | — | — | — | — | — | — | — | — |
| Dibasic acid ester* | — | — | — | — | — | — | 99.0 | 98.5 | — | — | — | — |

*Mixture of dimethyl adipate, succinate and glutarate
**didecyloxy poly(alkyleneoxy) ethanol

EXAMPLE 2

To a 6×16 inch freshly sanded pine board, a coating of each of the following paints were applied with a U.S.A. One Coat Plus 100% polyester brush. The paints were applied in the order shown.

1. Red Devil Gloss polyurethane oil enamel bottom coat—28 Mandarin Yellow.
2. Glidden House Paint Prime Coat 3651 oil based alkyd enamel—white.
3. Red Devil Gloss Polyurethane Oil Enamel—20 Empire Blue.
4. Glidden House Paint Prime Coat 3651 oil based alkyd enamel—white top coat.

Each coating of paint was allowed to dry 18-24 hours before applying the next coat. After the final coat (No. 4) was dried for 24 hours, the painted board was divided into 8 panels for testing of paint removable capacity and stripping time of each of formulations A–F in Table I which were applied to individual panels in a thickness of about ⅛". The results of these tests are reported in following Table II.

TABLE II

| Compositions | Number of Coats Removed |
|---|---|
| A | |
| after 10 minutes | 0.5 |
| after 15 minutes | 2.5 |
| after 20 minutes | 3.5 |
| after 25 minutes | 3.8 |
| B | |
| after 10 minutes | 0.1 |
| after 15 minutes | 1.5 |
| after 20 minutes | 2.0 |
| after 25 minutes | 3.1 |
| C | |
| after 10 minutes | 1.0 |
| after 15 minutes | 2.0 |
| after 20 minutes | 2.7 |
| after 30 minutes | 3.8 |
| D | |
| after 10 minutes | 0.5 |
| after 15 minutes | 1.0 |
| after 20 minutes | 2.0 |
| after 30 minutes | 3.2 |
| E | |
| after 10 minutes | 0.8 |
| after 15 minutes | 1.2 |
| after 20 minutes | 2.0 |
| after 30 minutes | 3.0 |
| F | |
| after 10 minutes | 0.5 |
| after 15 minutes | 0.5 |
| after 20 minutes | 0.8 |
| after 30 minutes | 2.0 |
| G and H | |
| after 10 minutes | 0 |
| after 30 minutes | 0 |
| after 60 minutes | 0 |
| after 90 minutes | 0 |
| I and J | |
| after 10 minutes | 0 |
| after 15 minutes | 0 |
| after 30 minutes | >0.1 |
| after 60 minutes | 2 |
| K | |
| after 20 minutes | 2.1 |
| L | |
| after 20 minutes | 2.5 |

It will be understood that many variations and additions can be made in the above compositions to meet particular stripping requirements, however these modifications are within the scope of this invention.

What is claimed is:

1. A stripping composition for removal of paints, varnish, shellac, enamel, polyurethanes coatings and inks from a substrate which consists essentially of (a) between 60 and about 98.5 wet. % of a component selected from the group consisting of N-methylpyrrolidone and a 90/10 to about 37/57 weight ratio mixture of N-methylpyrrolidone and gamma-butyrolactone and (b) between about 0.5 and about 5 wt. % cyclomethicone having the formula

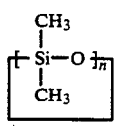

wherein n has a value of from 3 to 6.

2. The composition of claim 1 which additionally contains at least one additive selected from the group of a surfactant in an amount of up to about 10 wt. %; an evaporation retardant in an amount up to about 5 wt. %; a diluent in an amount up to about 50 wt. %; a coactivator selected from the group consisting of formic acid, acetic acid, hydroxy acetic acids, hydrogen peroxide, ethyl-3-ethoxy propionate, and organoamines in an amount up to about 10 wt. % employed with a buffer to control pH to between 3 and 4.5; and a thickening agent in an amount up to about 20 wt. %; said percentages based on the total composition of claim 1.

3. The composition of claim 1 which consists essentially of between 60 and about 90 wt. % of said N-methyl pyrrolidone or said mixture of methyl-pyrrolidone and gamma-butyrolactone and between about 0.5 and about 3.0 wt. % cyclomethicone.

4. The composition of claim 2 wherein said thickening agent is hydroxy-propyl cellulose.

5. 4. The composition of claim 2 wherein said diluent is propylene carbonate.

6. 4. The composition of claim 2 wherein said surfactant is tridecyloxy poly(alkyleneoxy)ethanol).

7. The composition of claim 2 wherein said coactivator is formic acid.

8. The composition of claim 2 wherein said coactivator is ethyl-3-ethoxy propionate.

9. The composition of claim 2 which consists essentially of about 98.5 parts by weight of N-methyl pyrrolidone, about 0.5 parts by weight cyclomethicone and about one part by weight hydroxy-propyl cellulose.

10. The composition of claim 2 which consists essentially of about 68 parts by weight N-methyl pyrrolidone, about 0.5 parts by weight cyclomethicone, about 1.5 parts by weight propyl cellulose, about 4 parts by weight ethyl-3-ethoxy propionate, about 18 parts by weight propylene carbonate, about one part by weight tridecyloxy poly(alkyleneoxy ethanol) and about 7 parts by weight formic acid.

11. The composition of claim 2 which consists essentially of about 37 parts by weight N-methylpyrrolidone, 57 parts by weight butyrolactone, 0.5 parts by weight of said cyclomethicone, 1.5 parts by weight of a hydroxypropyl cellulose, 3 parts by weight ethyl-3-ethoxy propionate and 1 part by weight tridecyloxy poly(alkyleneoxy) ethanol.

12. The process of removing a paint, varnish, shellac, enamel, polyurethane or ink coating from a substrate which comprises applying the composition of any one of claims 1 through 10 or 13 to said substrate in an amount sufficient to solubilize and separate said coating from said substrate.

* * * * *